United States Patent
Iwazaki et al.

(10) Patent No.: US 6,854,571 B2
(45) Date of Patent: Feb. 15, 2005

(54) ELECTROMAGNETIC BRAKE AND DRIVE FORCE DISTRIBUTING APPARATUS FOR VEHICLE USING THE ELECTROMAGNETIC BRAKE

(75) Inventors: Akihiro Iwazaki, Wako (JP); Rikiya Kunii, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 50 days.

(21) Appl. No.: 10/198,176

(22) Filed: Jul. 19, 2002

(65) Prior Publication Data

US 2003/0075395 A1 Apr. 24, 2003

(30) Foreign Application Priority Data

Sep. 4, 2001 (JP) ..................................... P2001-267785

(51) Int. Cl.$^7$ ............................................... F16D 55/36
(52) U.S. Cl. ...................... 188/71.5; 188/161; 192/222
(58) Field of Search ............................... 188/75.1, 161; 192/222, 12 D, 17 D, 226

(56) References Cited

U.S. PATENT DOCUMENTS

| | | | |
|---|---|---|---|
| 2,365,018 A | | 12/1944 | Stebbins |
| 2,863,326 A | * | 12/1958 | Maurice et al. .............. 192/222 |
| 3,429,409 A | | 2/1969 | Leblanc |
| 4,828,091 A | | 5/1989 | Gustin |
| 5,274,290 A | * | 12/1993 | Fischer ........................ 310/93 |
| 5,603,395 A | * | 2/1997 | Mabee ........................ 188/71.5 |
| 5,819,883 A | * | 10/1998 | Organek et al. ........... 188/71.5 |
| 6,182,803 B1 | * | 2/2001 | Hirai et al. ................. 188/171 |
| 6,412,613 B1 | * | 7/2002 | Lu .............................. 188/161 |
| 6,603,307 B2 | * | 8/2003 | Sekiya et al. ................ 188/161 |
| 6,668,996 B2 | * | 12/2003 | Nekado et al. ........... 192/84.91 |

FOREIGN PATENT DOCUMENTS

| | | |
|---|---|---|
| EP | 0 844 416 A2 | 5/1998 |
| JP | 6-33997 | 2/1994 |
| JP | 2000-81054 | 3/2000 |
| JP | 2001-116063 | 4/2001 |
| JP | 2001-116813 | 4/2001 |
| WO | WO 92/00474 | 1/1992 |
| WO | WO 96 02769 A | 2/1996 |

* cited by examiner

*Primary Examiner*—Robert A. Siconolfi
(74) *Attorney, Agent, or Firm*—Westerman, Hattori, Daniels & Adrian, LLP

(57) ABSTRACT

An electromagnetic brake interposed between a fixed housing and a rotating member. The electromagnetic brake includes a multiplate brake mechanism, a ringlike core member fixed in the fixed housing, an annular exciting coil accommodated in an annular groove formed on the core member, and a ringlike armature member opposed to the annular groove of the core member and having an outer diameter larger than the outer diameter of the core member. The electromagnetic brake further includes an annular pressure plate axially and movably mounted on the fixed housing at one end portion of the multiplate brake mechanism adjacent to the core member, and a cylindrical pressure member provided so as to surround the outer circumferential surface of the core member and be movable in a direction of pressing the multiplate brake mechanism as being guided by the core member. One end of the cylindrical pressure member is fixed to an outer circumferential portion of the armature member, and the other end is engaged with the annular pressure plate.

6 Claims, 9 Drawing Sheets

ELECTROMAGNETIC BRAKE AND DRIVE FORCE DISTRIBUTING APPARATUS FOR VEHICLE USING THE ELECTROMAGNETIC BRAKE

BACKGROUND OF THE INVENTION

1. Field of the Invention

The present invention relates to an electromagnetic brake and a drive force distributing apparatus for a vehicle using the electromagnetic brake.

2. Description of the Related Art

A differential is located in a power train of a vehicle to maintain torque distribution between right and left wheels of the vehicle such that torque is equally divided between the right and left wheels and to rotate the outside wheel faster than the inside wheel during cornering, thereby reliably obtain smooth cornering. While the primary role of the differential is to obtain smooth cornering as mentioned above, there is a case that one of the right and left wheels may be caught to slip in a muddy place during rough-road running.

In this case, the resistance from the road to the wheel caught to slip in the muddy place is small, so that torque is almost transmitted to this slipping wheel and hardly transmitted to the other wheel. As a result, there is a problem that the slipping wheel cannot escape from the muddy place for lack of the drive force for driving the wheels. This is a problem in a defect inherent in a general differential. Known is a special type of differential having a differential motion limiting mechanism capable of compensating for the above defect inherent in a general differential. This type of differential is referred to as a limited slip differential (LSD).

A planetary gear type differential is generally known in the art, for example, such a planetary gear type differential gear assembly having a limited slip differential mechanism composed of an electromagnetic clutch and a multiplate clutch is disclosed in Japanese Patent Laid-open No. Hei 6-33997. In this differential gear assembly, an attraction force between a solenoid and an armature forming the electromagnetic clutch is applied to the multiplate clutch to press it and selectively control an engaging force generated in the multiplate clutch. A connecting member consisting of a plurality of bars is located between a pressure plate of the multiplate clutch and the armature. That is, one end of each bar of the connecting member is fixed to the pressure plate of the multiplate clutch, and the other end abuts against an inner circumferential portion of the armature when the solenoid is operated.

In the conventional differential gear assembly mentioned above, the plural bars fixed to the pressure plate extend in a direction substantially perpendicular to the pressure plate. Accordingly, in the case that any of these bars are inclined to the pressure plate, there is a problem that a pressing force of the armature attracted by the solenoid to press the pressure plate of the multiplate clutch may not be uniformly transmitted to the pressure plate. Further, in the conventional differential gear assembly described in the above publication, the electromagnetic clutch controls the engaging force of the multiplate clutch, so that the plural bars as pressure members are located so as to correspond to the inner circumferential portion of the armature. However, in a multiplate brake structure having a plurality of brake plates and a plurality of brake discs, these brake plates and brake discs are generally located so as to correspond to an outer circumferential portion of the armature from the viewpoint of the structure. Accordingly, it is difficult that the conventional structure described in the above publication such that the multiplate clutch is operatively connected to the armature at its inner circumferential portion is applied to the multiplate brake structure without any changes.

SUMMARY OF THE INVENTION

It is therefore an object of the present invention to provide an electromagnetic brake which can achieve accurate positioning between an armature and a core member in the radial direction and can accurately control an engaging force generated in a multiplate brake mechanism.

It is another object of the present invention to provide a drive force distributing apparatus for a vehicle including the above electromagnetic brake which can arbitrarily distribute a drive force between right and left drive wheels of the vehicle.

In accordance with an aspect of the present invention, there is provided an electromagnetic brake interposed between a fixed housing and a rotating member at least partially accommodated in said fixed housing. The electromagnetic brake includes a multiplate brake mechanism having a plurality of brake plates mounted on said fixed housing and a plurality of brake discs mounted on said rotating member so as to be arranged in alternate relationship with said brake plates; a ringlike core member fixed in said fixed housing, said core member having an annular groove and a first outer diameter; an annular exciting coil accommodated in said annular groove of said core member; and a ringlike armature member arranged in opposed relationship with said annular groove of said core member, said armature member having a second outer diameter larger than said first outer diameter. The electromagnetic brake further includes a cylindrical pressure member provided so as to surround the outer circumferential surface of said core member and be movable in a direction of pressing said multiplate brake mechanism as being guided by said core member, said pressure member having a first end fixed to an outer circumferential portion of said armature member and a second end engaged with said multiplate brake mechanism.

With this configuration, accurate positioning between the armature member and the core member in the radial direction can be achieved by the cylindrical pressure member. Further, since the cylindrical pressure member is fixed to the armature member, inclination of the armature member with respect to the axial direction can be prevented, and a gap defined between the armature member and the core member can be accurately uniformed in the radial direction, thereby allowing accurate control of an engaging force generated in the multiplate brake mechanism. Accordingly, a braking function can be achieved without direct metallic contact, and an attraction force between the core member and the armature member can be efficiently transmitted to the multiplate brake mechanism. Further, the rigidity of the components of the electromagnetic brake in relation to the transmission of the attraction force is considered to minimize the elastic deformation of these components, thereby reducing the hysteresis and stably generating the attraction force.

Preferably, said core member has a plurality of fastening portions adapted to be fastened to said fixed housing, said fastening portions projecting radially outward from the outer circumference surface of said core member, and said pressure member has a plurality of cutouts for allowing insertion of said fastening portions of said core member. With this configuration, accurate positioning of the core member in the radial and axial directions with respect to the fixed housing can be achieved by the fastening portions. Furthermore, by forming the cutouts in the cylindrical pressure member, the pressure member fixed to the armature member can be fastened to the fixed housing in the condition where the pressure member is fitted with the core by inserting the fastening portions of the core member into the cutouts of the pressure member. Thus, the assembly of the electromagnetic brake can be easily performed.

Preferably, said core member has an inner circumferential portion and an outer circumferential portion divided from each other by said annular groove, the sectional area of said inner circumferential portion being substantially equal to that of said outer circumferential portion. With this configuration, the attraction force can be uniformed in the radial direction of the core member. More preferably, the inner circumferential surface of said pressure member is formed with a plurality of projections spaced apart from each other in the circumferential direction, and said pressure member is movable in said pressing direction so that said projections of said pressure member is in sliding contact with the outer circumferential surface of said core member. With this configuration, the cylindrical pressure member can be moved axially straight as being guided by the core member when the armature member is attracted to the core member. Accordingly, a pressing force uniform in the circumferential direction can be applied to the multiplate brake mechanism.

Further, the projections for ensuring the accuracy of alignment of the pressure member are formed on a part of the inner circumferential surface of the pressure member rather than the whole thereof, thereby allowing simplification of the structure and a reduction in friction during axial movement of the pressure member. Further, since the pressure member is provided so as to surround the outer circumferential surface of the core member, the second end of the pressure member can press the brake plates and the brake discs of the multiplate brake mechanism at a substantially central position in the effective radius. Accordingly, a uniform pressing force can be applied to the brake plates and the brake discs of the multiplate brake mechanism.

In accordance with another aspect of the present invention, there is provided a drive force distributing apparatus for a vehicle having a pair of drive wheels which includes a fixed housing; a first axle connected to one of said drive wheels; a second axle connected to the other drive wheel; an input shaft rotatably mounted in said fixed housing and connected to a drive source; a first planetary gear assembly having a first ring gear operatively connected to said input shaft, a first planetary carrier fixed to said first axle, a first sun gear rotatably mounted on said first axle, and a first planet gear carried by said first planetary carrier so as to mesh with both said first ring gear and said first sun gear; a second planetary gear assembly having a second ring gear operatively connected to said input shaft, a second planetary carrier fixed to said second axle, a second sun gear rotatably mounted on said second axle, and a second planet gear carried by said second planetary carrier so as to mesh with both said second ring gear and said second sun gear; a first multiplate brake mechanism interposed between said fixed housing and said first sun gear; a first electromagnetic brake for controllably operating said first multiplate brake mechanism; a second muitplate brake mechanism interposed between said fixed housing and said second sun gear; and a second electromagnetic brake for controllably operating said second multiplate brake mechanism; a drive force from said input shaft being distributed between said first axle and said second axle by operating said first electromagnetic brake and said second electromagnetic brake.

In accordance with a further aspect of the present invention, there is provided a drive force distributing apparatus for a four-wheel drive vehicle having a pair of first drive wheels and a pair of second drive wheels, which includes a fixed housing; a first axle connected to one of said first drive wheels; a second axle connected to the other first drive wheel; an input shaft rotatably mounted in said fixed housing and connected to a drive source; a first planetary gear assembly having a first ring gear operatively connected to said input shaft, a first planetary carrier fixed to said first axle, a first sun gear rotatably mounted on said first axle, and a first planet gear carried by said first planetary carrier so as to mesh with both said first ring gear and said first sun gear; a second planetary gear assembly having a second ring gear operatively connected to said input shaft, a second planetary carrier fixed to said second axle, a second sun gear rotatably mounted on said second axle, and a second planet gear carried by said second planetary carrier so as to mesh with both said second ring gear and said second sun gear; a first multiplate brake mechanism interposed between said fixed housing and said first sun gear; a first electromagnetic brake for controllably operating said first multiplate brake mechanism; a second multiplate brake mechanism interposed between said fixed housing and said second sun gear; and a second electromagnetic brake for controllably operating said second multiplate brake mechanism; a drive force from said input shaft being distributed among said first axle, said second axle, and said second drive wheels by operating said first electromagnetic brake and said second electromagnetic brake.

Preferably, said first electromagnetic brake includes a first ringlike core member fixed in said fixed housing, said first core member having a first annular groove and a first outer diameter; a first annular exciting coil accommodated in said first annular groove of said first core member; a first ringlike armature member arranged in opposed relationship with said first annular groove of said first core member, said first armature member having a second outer diameter larger than said first outer diameter; a first annular pressure plate axially and movably mounted on any one of said fixed housing and said first axle at one end portion of said first multiplate brake mechanism adjacent to said first core member; and a first cylindrical pressure member provided so as to surround the outer circumferential surface of said first core member and be movable in a direction of pressing said first multiplate brake mechanism as being guided by said first core member, said first pressure member having a first end fixed to an outer circumferential portion of said first armature member and a second end engaged with said first annular pressure plate.

Preferably, said second electromagnetic brake includes a second ringlike core member fixed in said fixed housing, said second core member having a second annular groove and a third outer diameter; a second annular exciting coil accommodated in said second annular groove of said second core member; a second ring-like armature member arranged in opposed relationship with said second annular groove of said second core member, said second armature member having a fourth outer diameter larger than said third outer diameter; a second annular pressure plate axially and movably mounted on any one of said fixed housing and said second axle at one end portion of said second multiplate brake mechanism adjacent to said second core member; and a second cylindrical pressure member provided so as to surround the outer circumferential surface of said second core member and be movable in a direction of pressing said second multiplate brake mechanism as being guided by said second core member, said second pressure member having a third end fixed to an outer circumferential portion of said second armature member and a fourth end engaged with said second annular pressure plate.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
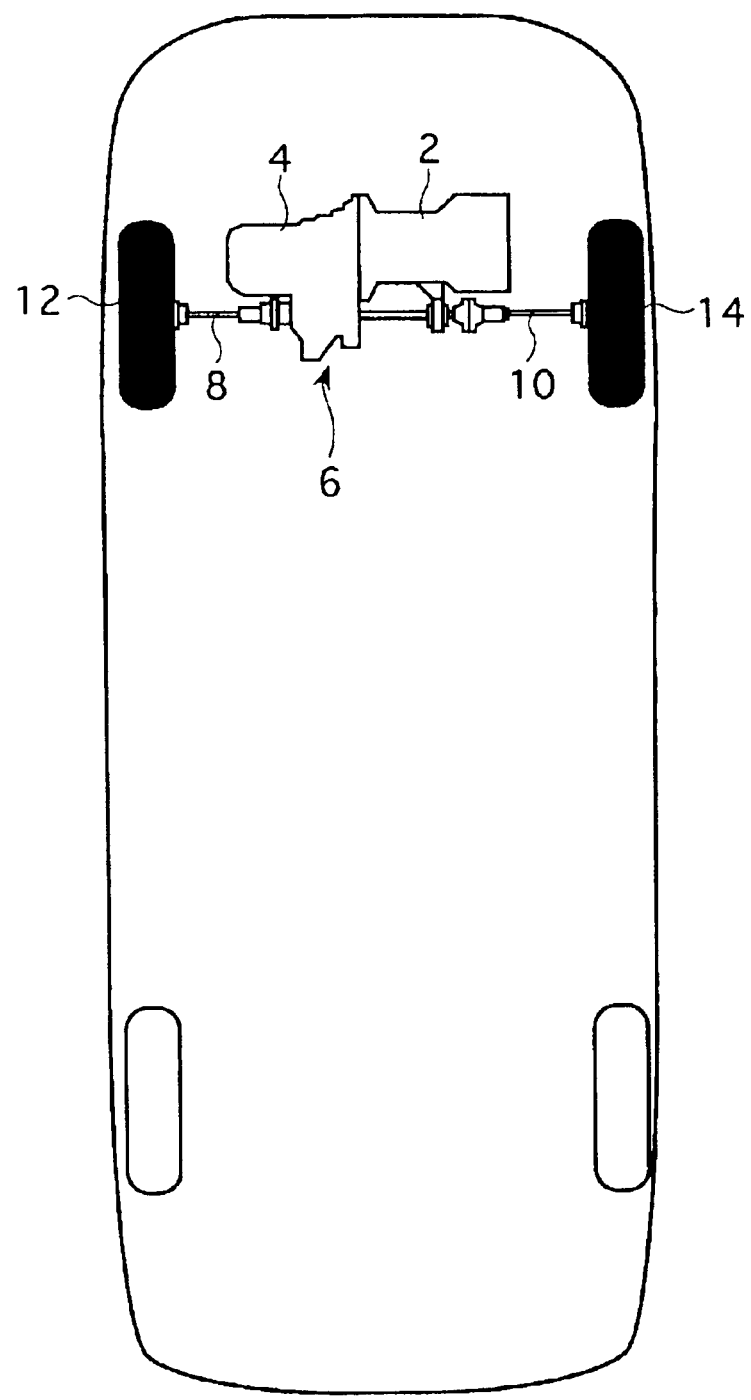
FIG. 1 is a schematic plan view showing the configuration of a FF (front-engine front-drive) vehicle on which the drive force distributing apparatus according to the present invention is mounted.

A preferred embodiment of the present invention will now be described in detail with reference to the drawings. FIG. 1 is a schematic plan view showing the configuration of a front-engine front-drive (FF) vehicle to which a drive force distributing apparatus 6 having the electromagnetic brake of the present invention is applied. A drive force from an engine 2 is transmitted through a transmission 4 to the drive force distributing apparatus 6. The drive force transmitted is distributed between a left front axle 8 and a right front axle 10 by the drive force distributing apparatus 6. The drive force thus distributed drives a left front wheel 12 mounted on the left front axle 8 and a right front wheel 14 mounted on the right front axle 10.

Figure 2:
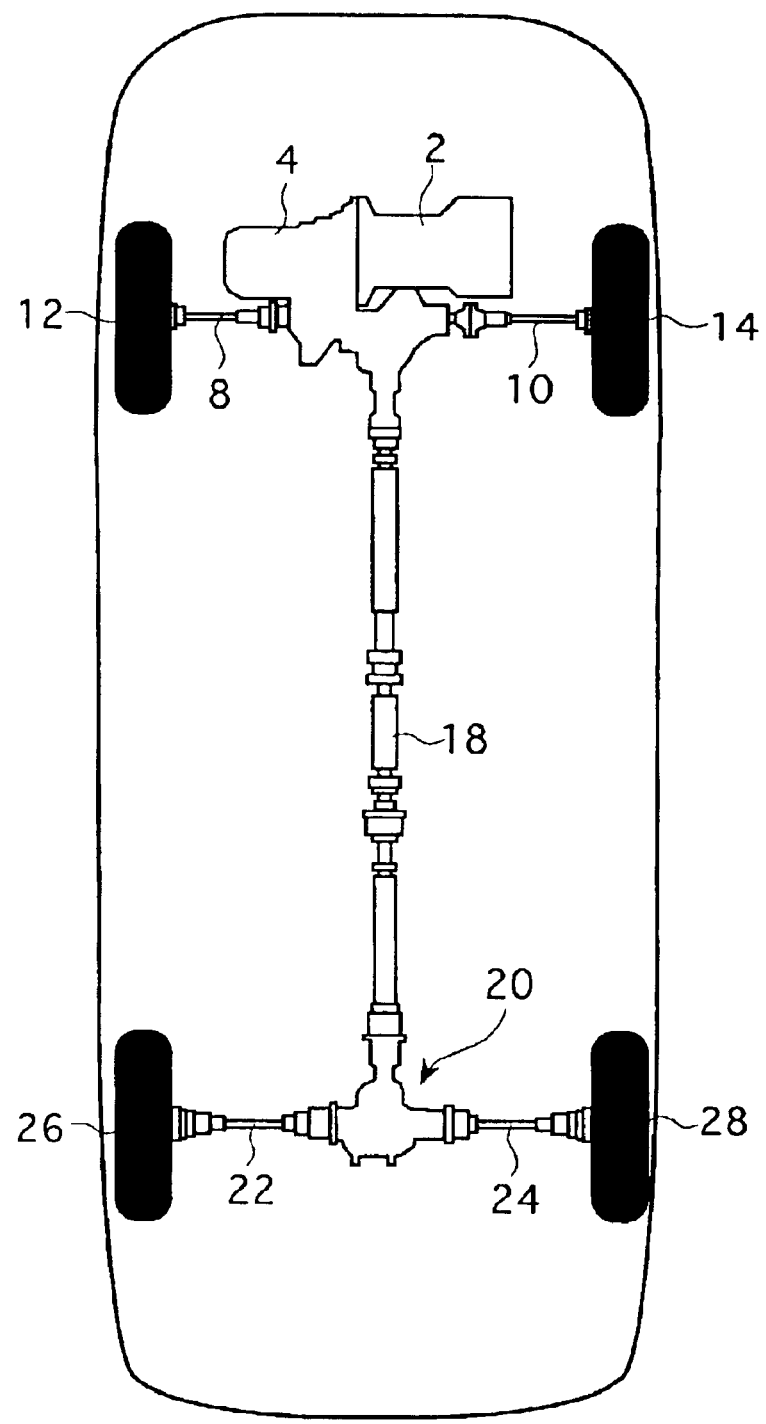
FIG. 2 is a schematic plan view showing the configuration of a four-wheel drive vehicle on which the drive force distributing apparatus according to the present invention is mounted.

FIG. 2 is a schematic plan view showing the configuration of a four-wheel drive vehicle to which a drive force distributing apparatus 20 having the electromagnetic brake of the present invention is applied. A drive force from an engine 2 drives left and right front wheels 12 and 14 through a transmission 4 and left and right front axles 8 and 10. The drive force is also transmitted through a propeller shaft 18 to the drive force distributing apparatus 20 having substantially the same configuration as that of the drive force distributing apparatus 6 shown in FIG. 1. The drive force transmitted to the drive force distributing apparatus 20 is distributed between a left rear axle 22 and a right rear axle 24 at a given ratio. The drive force thus distributed drives a left rear wheel 26 mounted on the left rear axle 22 and a right rear wheel 28 mounted on the right rear axle 24. As will be hereinafter described in detail, the drive force distributing apparatus 20 incorporates a pair of electromagnetic brakes. By controlling braking forces of the electromagnetic brakes, the drive force from the propeller shaft 18 can be arbitrarily distributed between the rear wheels 26 and 28. Further, in the case of idling the rear wheels 26 and 28, the drive force from the engine 2 can be entirely supplied to the front wheels 12 and 14. In this case, this four-wheel drive vehicle operates as an FF vehicle.

Figure 3:
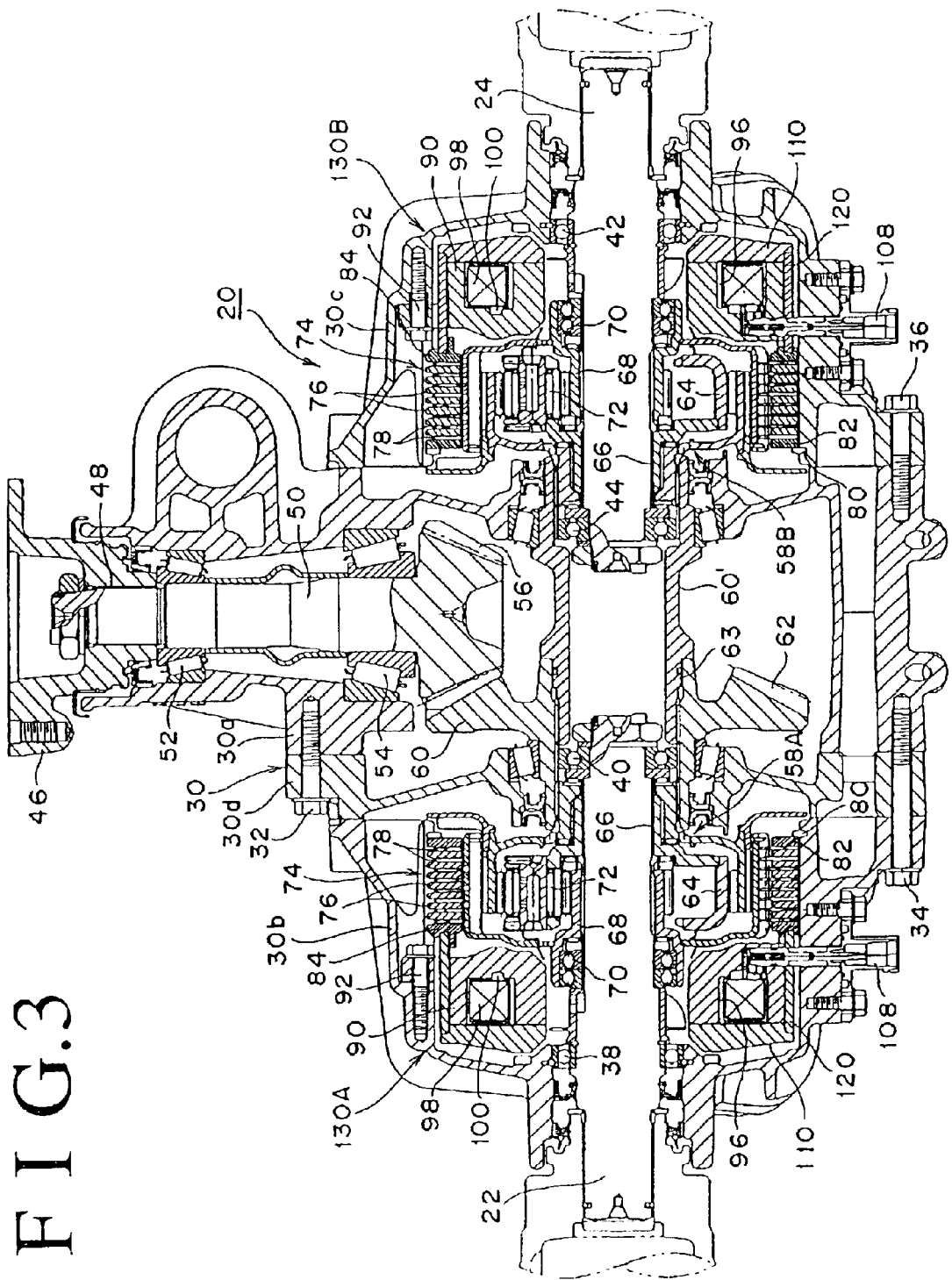
FIG. 3 is a sectional view of the drive force distributing apparatus shown in FIG. 2.
Figure 4:
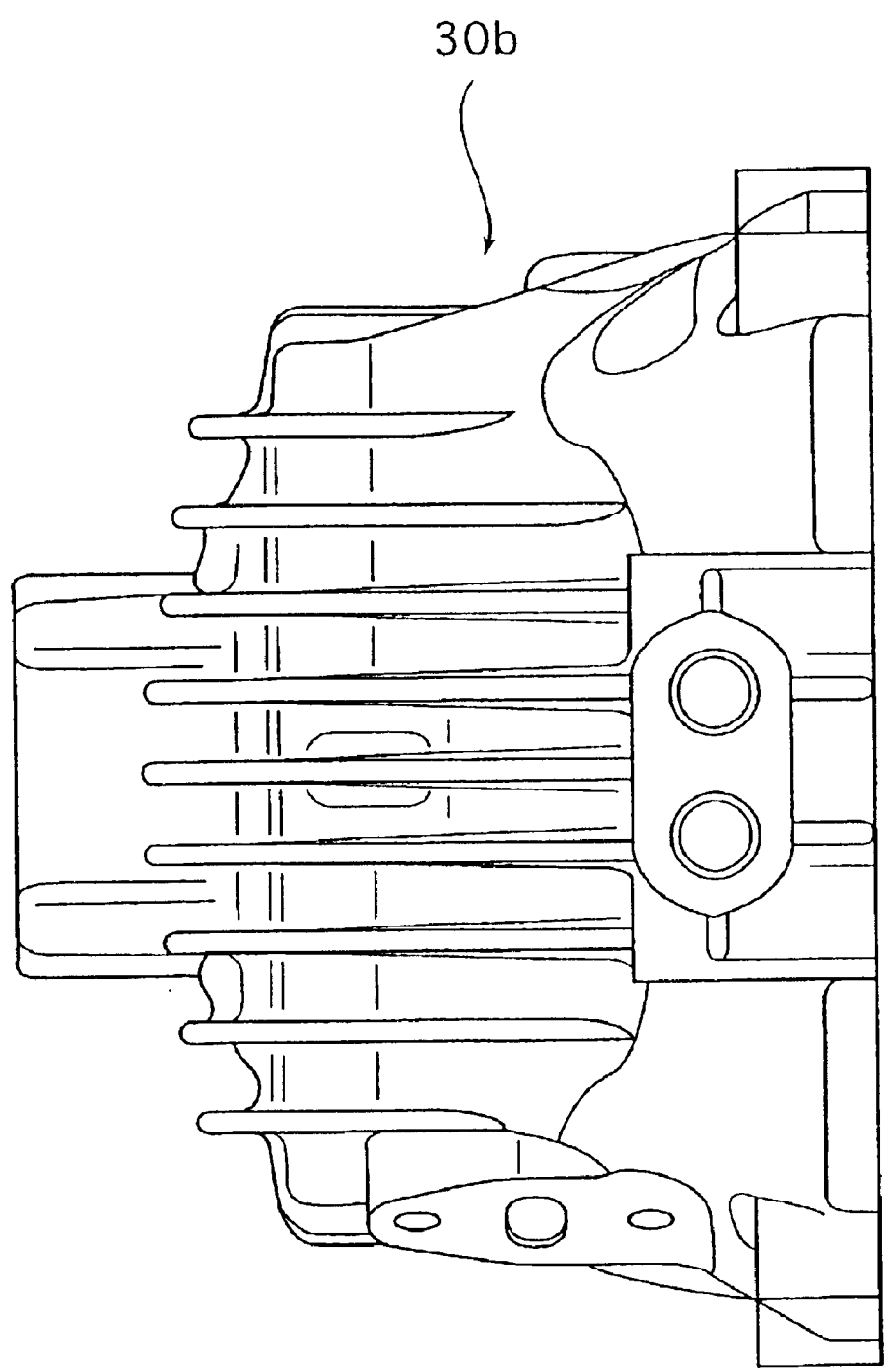
FIG. 4 is an elevational view of a side housing.
Figure 5:
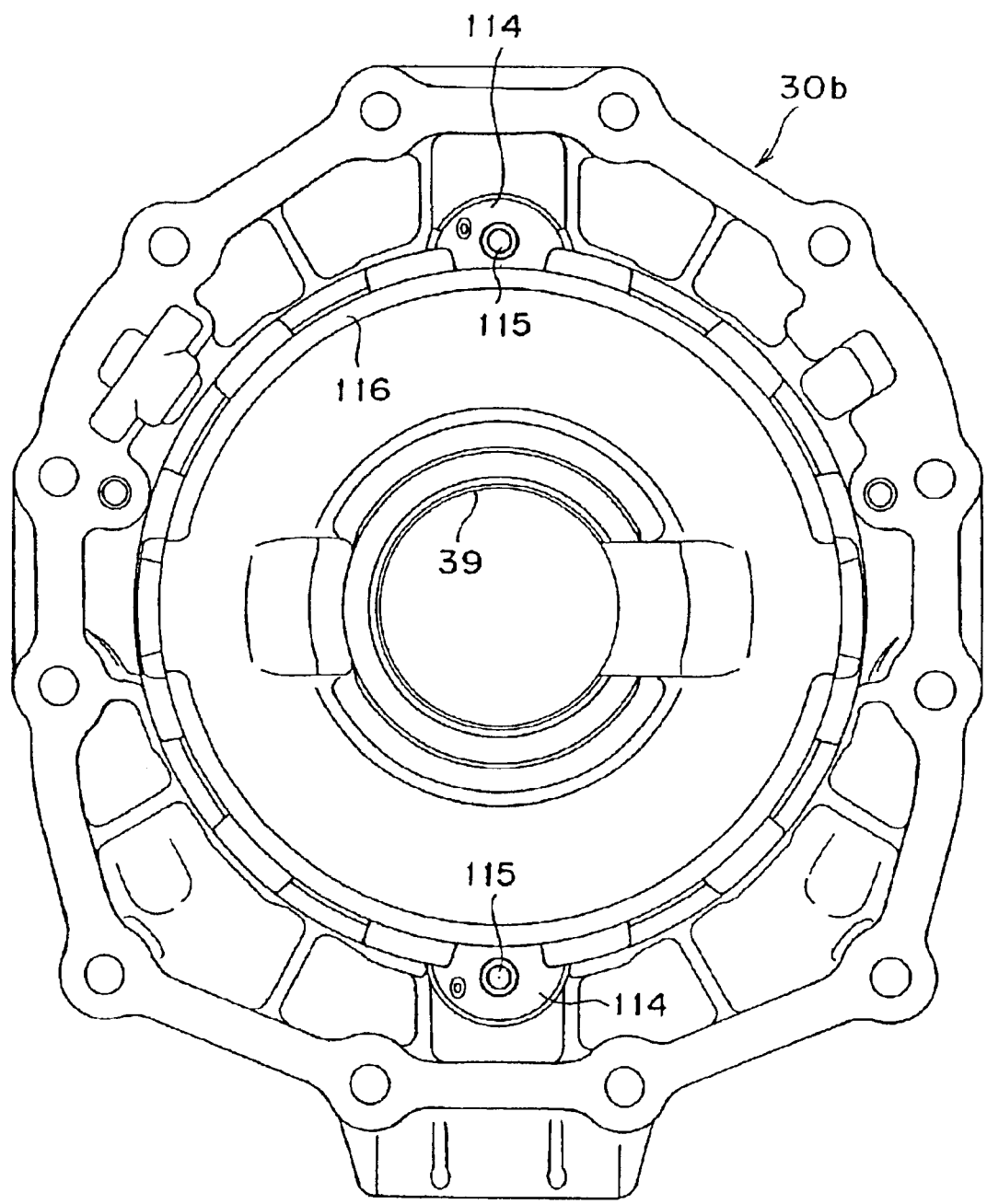
FIG. 5 is a right side view of the left side housing shown in FIG. 4.

Referring to FIG. 3, there is shown a sectional view of the drive force distributing apparatus 20. Reference numeral 30 denotes a fixed housing. The fixed housing 30 is composed of a central housing 30a, a left side housing 30b, a right side housing 30c, and an intermediate housing 30d. The left side housing 30b and the intermediate housing 30d are fastened to the central housing 30a by screws 32 and 34. The right side housing 30c is fastened to the central housing 30a by screws 36. FIG. 4 is an elevational view of the left side housing 30b, and FIG. 5 is a right side view of FIG. 4.

The left rear axle 22 is rotatably supported in the housing 30 by a pair of bearings 38 and 40. Similarly, the right rear axle 24 is rotatably supported in the housing 30 by a pair of bearings 42 and 44. The left rear axle 22 is connected to the left rear wheel 26, and the right rear axle 24 is connected to the right rear wheel 28. Reference numeral 46 denotes a companion flange, which is fastened to the propeller shaft 18 shown in FIG. 2 by screws (not shown). An input shaft 50 is rotatably supported in the housing 30 by a pair of needle bearings 52 and 54. The input shaft 50 is connected at its front end to the companion flange 46 by splines 48. The input shaft 50 is formed at its rear end with a bevel gear 56.

A planetary gear assembly 58A is interposed between the input shaft 50 and the left rear axle 22, and a planetary gear assembly 58B is interposed between the input shaft 50 and the right rear axle 24. The planetary gear assembly 58A has substantially same structure as that of the planetary gear assembly 58B, so like parts are denoted by the same reference numerals and only the planetary gear assembly 58A will now be primarily described.

Reference numeral 60 denotes an input ring gear of the planetary gear assembly 58A. The input ring gear 60 is formed at its right end with a bevel gear 62. The bevel gear 62 of the input ring gear 60 meshes with the bevel gear 56 of the input shaft 50. The planetary gear assembly 58B has a ring gear 60' connected to the ring gear 60 of the planetary gear assembly 58A by splines 63. Accordingly, the ring gear 60' of the planetary gear assembly 58B is rotationally driven by the input shaft 50 through the ring gear 60 of the planetary gear assembly 58A.

The planetary gear assembly 58A further includes a planetary carrier 64, a sun gear 68, and a plurality of planet gears 72 (only one of which being shown). The planetary carrier 64 is fixed to the left rear axle 22 by splines 66. The sun gear 68 is rotatably mounted on the left rear axle 22 by a bearing 70. Each planet gear 72 is carried by the planetary carrier 64 and meshes with both the sun gear 68 and the ring gear 60. Reference numeral 74 denotes a wet type multiplate brake mechanism. The wet type multiplate brake mechanism 74 includes a plurality of brake plates 76 mounted on the housing 30 and a plurality of brake discs 78 mounted on the sun gear 68. The brake plates 76 and the brake discs 78 are alternately arranged.

Each brake plate 76 is mounted on the housing 30 so as to be axially movable and unrotatable, and each brake disc 78 is mounted on the sun gear 68 so as to be axially movable and unrotatable. A snap ring 80 is mounted on the housing 30 to axially position one end (the right end) of the multiplate brake mechanism 74. Fine adjustment of this positioning is made by controlling the thickness of a shim 82 located axially adjacent to the snap ring 80.

Figure 6A:
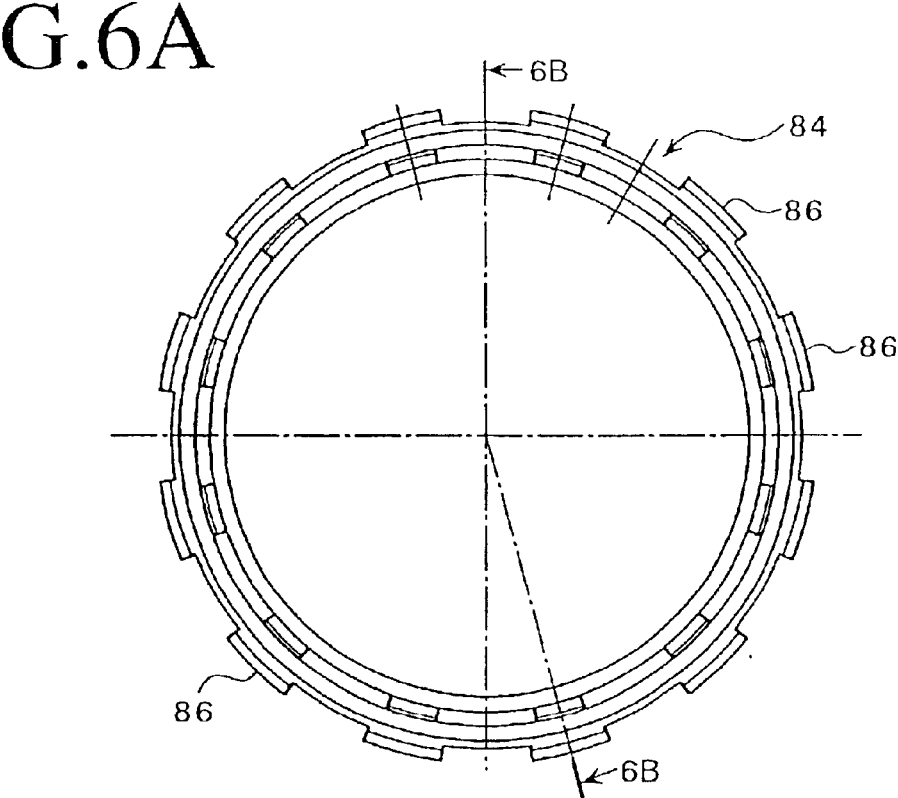
FIG. 6A is an elevational view of an annular pressure plate.
Figure 6B:
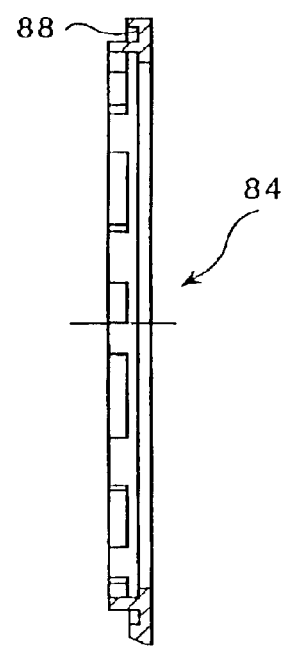
FIG. 6B is a cross section taken along the line 6B—6B in FIG. 6A.

An annular pressure plate 84 is provided at the other end (the left end) of the multiplate brake mechanism 74. As shown in FIG. 6A, the annular pressure plate 84 has a plurality of projections 86 spaced apart from each other in the circumferential direction. These projections 86 are inserted in axial grooves formed on the inner wall of the housing 30, so that the annular pressure plate 84 is mounted on the housing 30 so as to be axially movable and unrotatable. As best shown in FIG. 6B, the annular pressure plate 84 is formed at its outer circumferential portion with an annular groove 88 for insertion of a cylindrical pressure member to be hereinafter described. The annular pressure plate 84 may be mounted on the sun gear 68.

Figure 7A:
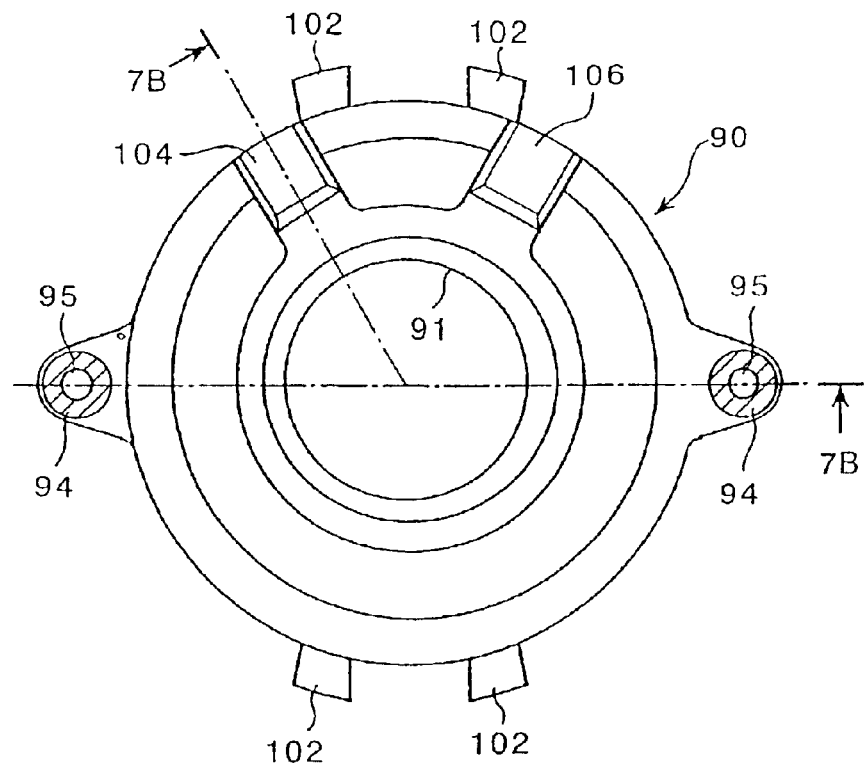
FIG. 7A is an elevational view of a ringlike core member.
Figure 7B:
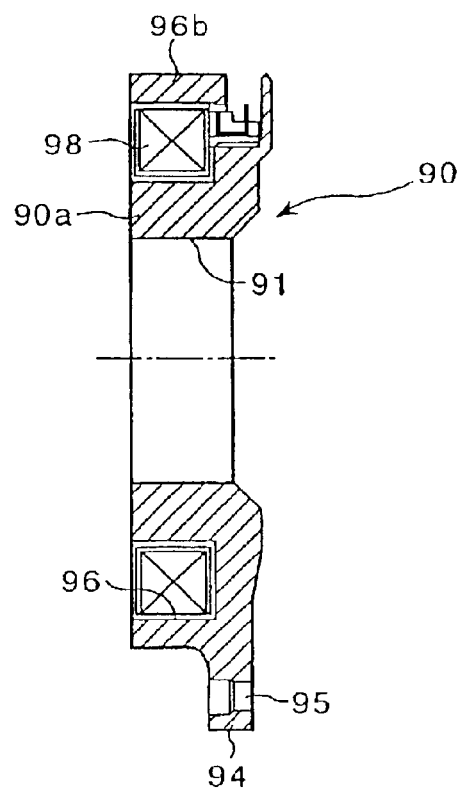
FIG. 7B is a cross section taken along the line 7B—7B in FIG. 7A.

Reference numeral 90 denotes a ringlike core member, which has a first outer diameter and an annular groove 96 having a rectangular cross section. As shown in FIG. 7A, the ringlike core member 90 has a central hole 91 and a pair of fastening portions 94. Each fastening portion 94 is formed with a hole 95 for insertion of a screw 92 (see FIG. 3). As best shown in FIG. 7B, an exciting coil 98 is accommodated in the annular groove 96. The core member 90 is divided into an inner circumferential portion 90a and an outer circumferential portion 90b by the annular groove 96. The sectional area of the inner circumferential portion 90a is substantially equal to that of the outer circumferential portion 90b.

As shown in FIG. 7A, the core member 90 has four projections 102, a recess 104 for insertion of an exciting coil terminal 108 (see FIG. 3), and a recess 106 for insertion of a search coil terminal (not shown). As shown in FIG. 3, a search coil 100 is mounted in the annular groove 96 adjacent to the exciting coil 98. The search coil 100 is provided to detect the intensity of magnetic flux in passing a current through the exciting coil 98 and control a coil current supplied to the exciting coil 98 according to the detected intensity of magnetic flux.

As shown in FIG. 5, the left side housing 30b has a central hole 39 and a pair of mounting portions 114. Each mounting portion 114 is formed with a tapped hole 115. The left side housing 30b further has an annular abutting portion 116. The core member 90 is fixed to the left side housing 30b by making the projections 102 of the core member 90 abut against the annular abutting portion 116 of the left side housing 30b, making the fastening portions 94 of the core member 90 abut against the mounting portions 114 of the left side housing 30b, and inserting the screws 92 through the holes 95 of the fastening portions 94 to threadedly engage the screws 92 into the tapped holes 115 of the mounting portions 114.

Figure 8:
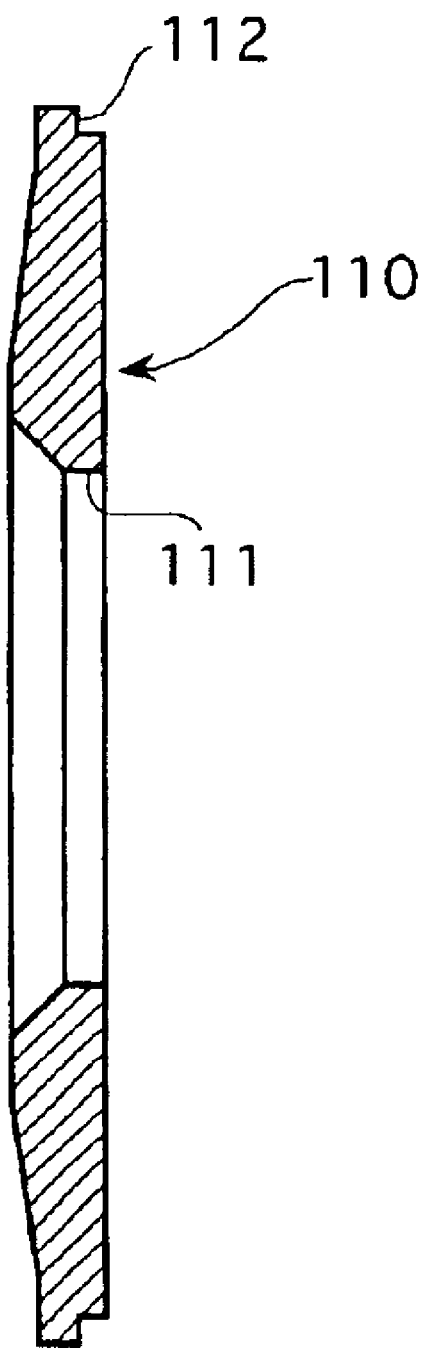
FIG. 8 is a sectional view of a ringlike armature member.

A ringlike armature member 110 formed of a magnetic material is located so as to be opposed to the annular groove 96 of the core member 90. As shown in FIG. 8, the armature member 110 has a second outer diameter larger than the first outer diameter of the core member 90, a central hole 111, and an annular mounting groove 112 formed at an outer circumferential portion. The armature member 110 is tapered from its inner circumference toward its outer circumference as viewed in cross section, so as to uniform a magnetic path in passing a current through the exciting coil 98 and to reduce the weight.

A cylindrical pressure member 120 has a first end (left end) press-fitted with the annular mounting groove 112 of the armature member 110, and a second end (right end) inserted in the annular groove 88 of the annular pressure plate 84. In inserting the second end of the cylindrical pressure member 120 into the annular groove 88 of the annular pressure plate 84, the outer circumference of the cylindrical pressure member 120 is positioned with respect to the annular groove 88. That is, the second end of the cylindrical pressure member 120 is inserted into the annular groove 88 of the annular pressure plate 84 in the condition where the inner circumference of the cylindrical pressure member 120 is loosely fitted with the inner circumference of the annular groove 88 and the outer circumference of the cylindrical pressure member 120 is closely fitted with the outer circumference of the annular groove 88.

Figure 9A:
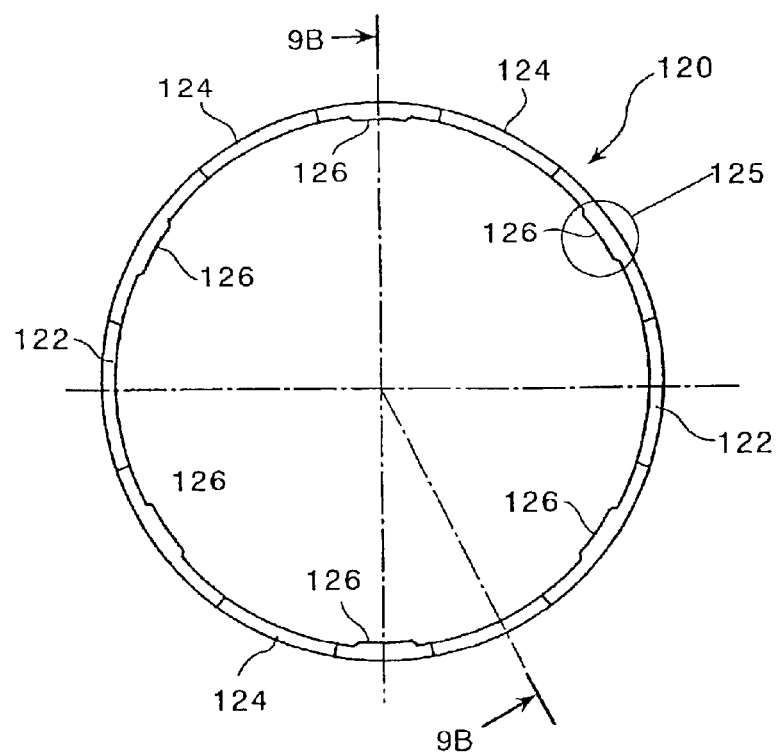
FIG. 9A is an elevational view of a cylindrical pressure member.
Figure 9B:
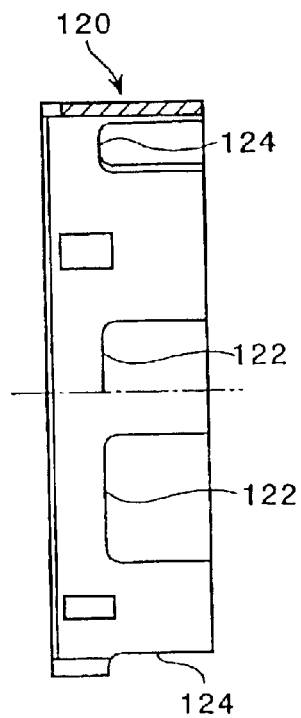
FIG. 9B is a cross section taken along the line 9B—9B in FIG. 9A.
Figure 9C:
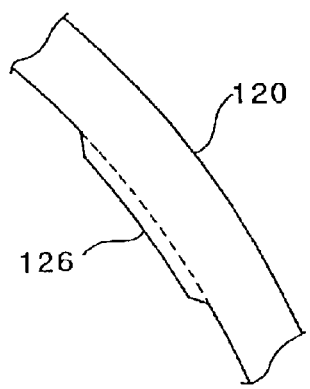
FIG. 9C is an enlarged view of an encircled portion 125 shown in FIG. 9A.

As shown in FIGS. 9A and 9B, the cylindrical pressure member 120 has a pair of cutouts 122 for insertion of the pair of fastening portions 94 of the core member 90 and four cutouts 124 for insertion of the four projections 102 of the core member 90. The inner circumferential surface of the cylindrical pressure member 120 is formed with six projections 126 spaced apart from each other in the circumferential direction. Accordingly, the cylindrical pressure member 120 is movable in its pressing direction (axial direction) in the condition where the projections 126 are in sliding contact with the outer circumferential surface of the core member 90.

An electromagnetic brake 130A including the multiplate brake mechanism 74 is assembled by first press-fitting the first end (left end) of the cylindrical pressure member 120 into the annular mounting groove 112 of the armature member 110, next covering the ring-like core member 90 with the cylindrical pressure member 120 fixed to the armature member 110, next inserting the second end (right end) of the cylindrical pressure member 120 into the annular groove 88 of the annular pressure plate 84, and finally fastening the ringlike core member 90 at the pair of fastening portions 94 to the housing 30.

As mentioned above, the sectional area of the inner circumferential portion 90a of the core member 90 is substantially equal to that of the outer circumferential portion 90b of the core member 90. To this end, the width of the inner circumferential portion 90a is set larger than that of the outer circumferential portion 90b as viewed in the cross section perpendicular to the axial direction. Furthermore, the ringlike armature member 110 is tapered from the inner circumference toward the outer circumference, so as to uniform a magnetic path in passing a current through the exciting coil 98. With this configuration, the armature member 110 can be attracted by a uniform force over the radius thereof in passing a current through the exciting coil 98. That is, by uniforming the magnetic path, the armature member 110 can be prevented from being inclined with respect to the axial direction, and an engaging force of the multiplate brake mechanism 74 in the electromagnetic brake 130A can therefore be accurately controlled.

When a current is passed through the exciting coil 98, a predetermined gap is defined between the core member 90 and the armature member 110, thereby preventing metallic contact between the core member 90 and the armature member 110. The axial positioning of the armature member 110 in the condition where the armature member 110 is attracted to the core member 90 by passing a current through the exciting coil 98 is determined by the mounting portions 114 of the left side housing 30b for fastening the core member 90 to the left side housing 30b and by the position of the snap ring 80 provided at the right end of the multiplate brake mechanism 74 and fixed to the left side housing 30b.

The fine adjustment of this axial positioning is made by controlling the thickness of the shim 82 located adjacent to the snap ring 80 to thereby control the accuracy of the gap between the core member 90 and the armature member 110. While the left planetary gear assembly 58A and the left electromagnetic brake 130A have been described, the right planetary gear assembly 58B and the right electromagnetic brake 130B are substantially the same in structure as the left planetary gear assembly 58A and the left electromagnetic brake 130A, respectively, so the description of the right planetary gear assembly 58B and the right electromagnetic brake 130B will be omitted herein.

According to the electromagnetic brake 130A in this preferred embodiment, the cylindrical pressure member 120 is located around the outer circumferential surface of the ringlike core member 90, so that the right end of the pressure member 120 can press the plural brake plates 76 and the plural brake discs 78 forming the multiplate brake mechanism 74 at their substantially central portions in respect of the effective radius of each element. Accordingly, a uniform pressing force to the multiplate brake mechanism 74 can be obtained with no radial deviation. Further, since the pressing force of the cylindrical pressure member 120 to the multiplate brake mechanism 74 is applied axially straight as being guided by the core member 90, a reduction in control accuracy of braking engagement due to deflection of the cylindrical pressure member 120 can be suppressed.

A brake plate with a facing known in the art can be used without any changes as each brake plate 76 of the multiplate brake mechanism 74, thereby preventing seizure and judder occurring between metallic plates forming the multiplate brake mechanism 76 during the operation of the electromagnetic brake 130A. Since an air gap is defined between the exciting coil 98 and the armature member 110, no residual magnetism is generated in a magnetic path in attracting the armature member 110, thereby improving the stability of control of an attraction force to the armature member 110 and eliminating the need for any parts for canceling an attraction force due to residual magnetism. Furthermore, it is possible to improve the falling response in turning off an electrical signal to the electromagnetic brake 130A and the rising response in turning on an electrical signal to the electromagnetic brake 130A. Furthermore, since the electromagnetic brake 130A is simple in structure, the hysteresis can be reduced.

The operation of this preferred embodiment will now be described. When both the electromagnetic brakes 130A and 130B are in an off state with no currents being passed through the exciting coils 98 of the electromagnetic brakes 130A and 130B, both the multiplate brake mechanism 74 are in a disengaged state, so that the sun gears 68 of the planetary gear assemblies 58A and 58B idly rotate about the left and right rear axles 22 and 24, respectively. Accordingly, the drive force (torque) from the input shaft 50 is not transmitted to the rear axles 22 and 24. In this case, the rear wheels 26 and 28 idly rotate and the drive force is entirely transmitted to the front wheels 12 and 14, so that the four-wheel drive vehicle shown in FIG. 3 operates in a two-wheel drive mode (FF vehicle).

When a predetermined amount of current is passed through the exciting coils 98 of the electromagnetic brakes 130A and 130B to completely engage both the multiplate brake mechanisms 74 through the cylindrical pressure members 120 of the electromagnetic brakes 130A and 130B, the sun gears 68 of the planetary gear assemblies 58A and 58B are fixed to the left and right rear axles 22 and 24, respectively. Accordingly, the drive force from the input shaft 50 is equally divided between the rear axles 22 and 24 and transmitted thereto. As a result, the four-wheel drive vehicle shown in FIG. 2 operates in a four-wheel drive mode to run straight. In the case of a front-engine rear-drive (FR) vehicle, the entirety of the drive force is equally divided between the rear wheels, and this vehicle runs straight.

In cornering or escaping from a muddy place, the amperages of the currents passing through the exciting coils 98 of the electromagnetic brakes 130A and 30B are controlled to thereby arbitrarily distribute the drive force from the input shaft 50 between the rear axles 22 and 24, so that optimum cornering control and/or easy escape from the muddy place can be realized.

While the drive force distributing apparatus 20 provided in relation to the rear axles 22 and 24 has been described above with reference to FIGS. 2 to 9C, the drive force distributing apparatus 6 provided in relation to the front axles 8 and 10 as shown in FIG. 1 also has similar operations and effects. Further, while the drive force distributing apparatus 20 is provided in relation to the rear axles 22 and 24 of the four-wheel drive vehicle in this preferred embodiment, the apparatus 20 may be provided in relation to the rear axles of an FR vehicle. Further, while the electromagnetic brake of the present invention is applied to the drive force distributing apparatus 20 in this preferred embodiment, the present invention is not limited to this preferred embodiment, but may be applied to any mechanisms or apparatuses having an electromagnetic brake interposed between a fixed housing and a rotating member.

While the preferred embodiments of the present invention have been described using the specific terms, such description is for illustrative purposes only, and it is to be understood that changes and variations may be made without departing from the spirit or scope of the following claims.

What is claimed is:

1. An electromagnetic brake interposed between a fixed housing and a rotating member at least partially accommodated in said fixed housing, comprising:

a multiplate brake mechanism having a plurality of brake plates mounted on said fixed housing and a plurality of brake discs mounted on said rotating member so as to be arranged in alternate relationship with said brake plates;

a ringlike core member fixed in said fixed housing, said core member having an annular groove and a first outer diameter;

an annular exciting coil accommodated in said annular groove of said core member;

a ringlike armature member arranged in opposed relationship with said annular groove of said core member, said armature member having a second outer diameter larger than said first outer diameter; and a cylindrical pressure member provided so as to surround the outer circumferential surface of said core member and be movable in a direction of pressing said multiplate brake mechanism as being guided by said core member, said pressure member having a first end fixed to an outer circumferential portion of said armature member and a second end engaged with said multiplate brake mechanism.

2. An electromagnetic brake according to claim 1, wherein said core member has a plurality of fastening portions adapted to be fastened to said fixed housing, said fastening portions projecting radially outward from the outer circumference surface of said core member, and said pressure member has a plurality of cutouts for allowing insertion of said fastening portions of said core member.

3. An electromagnetic brake according to claim 1, wherein said core member has an inner circumferential portion and an outer circumferential portion divided from each other by said annular groove, the sectional area of said inner circumferential portion being substantially equal to that of said outer circumferential portion.

4. An electromagnetic brake according to claim 1, wherein the inner circumferential surface of said pressure member is formed with a plurality of projections spaced apart from each other in the circumferential direction, and said pressure member is movable in said pressing direction so that said projections of said pressure member is in sliding contact with the outer circumferential surface of said core member.

5. An electromagnetic brake according to claim 1, wherein said cylindrical pressure member presses the plural brake plates and the plural brake discs at their substantially central portions in respect of the effective radius of the plural brake plates and the plural brake discs.

6. An electromagnetic brake according to claim 1, wherein the pressing force of said cylindrical pressure member to said multiple brake mechanism is applied axially straight as being guided by said core member.

* * * * *